United States Patent
Kent et al.

(10) Patent No.: US 8,648,815 B2
(45) Date of Patent: Feb. 11, 2014

(54) TOUCH PANEL THAT HAS AN IMAGE LAYER AND DETECTS BENDING WAVES

(75) Inventors: Joel C. Kent, Fremont, CA (US); Steven Abramovich, Waban, MA (US)

(73) Assignee: Elo Touch Solutions, Inc., Menlo Park, CA (US)

( * ) Notice: Subject to any disclaimer, the term of this patent is extended or adjusted under 35 U.S.C. 154(b) by 1033 days.

(21) Appl. No.: 12/705,690

(22) Filed: Feb. 15, 2010

(65) Prior Publication Data

US 2011/0199315 A1 Aug. 18, 2011

(51) Int. Cl.
*G06F 3/041* (2006.01)

(52) U.S. Cl.
USPC .......................... 345/173; 345/175

(58) Field of Classification Search
USPC .................................. 345/173–177
See application file for complete search history.

(56) References Cited

U.S. PATENT DOCUMENTS

| | | | |
|---|---|---|---|
| 4,645,870 | A | 2/1987 | Adler |
| 6,871,149 | B2 | 3/2005 | Sullivan et al. |
| 7,411,581 | B2 | 8/2008 | Hardie-Bick |
| 2004/0263492 | A1 | 12/2004 | Chao et al. |
| 2005/0156911 | A1 | 7/2005 | Tanaka et al. |
| 2005/0174335 | A1 | 8/2005 | Kent et al. |
| 2008/0303800 | A1* | 12/2008 | Elwell ............................ 345/173 |
| 2009/0172986 | A1 | 7/2009 | Fuchsberg et al. |
| 2010/0238139 | A1* | 9/2010 | Goertz et al. .................. 345/175 |
| 2011/0012845 | A1* | 1/2011 | Rothkopf et al. ............. 345/173 |
| 2011/0050647 | A1* | 3/2011 | Lee et al. ....................... 345/175 |
| 2011/0090176 | A1* | 4/2011 | Christiansson et al. ...... 345/175 |
| 2011/0122091 | A1* | 5/2011 | King et al. ..................... 345/175 |
| 2012/0268423 | A1* | 10/2012 | Hotelling et al. ............. 345/174 |
| 2012/0287086 | A1* | 11/2012 | Soo et al. ....................... 345/175 |

FOREIGN PATENT DOCUMENTS

| | | |
|---|---|---|
| CN | 1484195 A | 3/2004 |
| TW | I275775 B | 3/2007 |

OTHER PUBLICATIONS

Taiwanese Office Action for Application No. 096117938, dated Feb. 19, 2013.

* cited by examiner

*Primary Examiner* — Ricardo L Osorio
(74) *Attorney, Agent, or Firm* — Alston & Bird LLP

(57) ABSTRACT

A touch panel includes a substrate that has top and bottom surfaces. A reflective image layer has top and bottom surfaces and displays an image. The bottom surface of the reflective image layer is bonded to the top surface of the substrate to form a stack having top and bottom sides. At least one sensor detects signals associated with bending waves propagating through the stack. The signals are used to identify coordinate locations of at least one touch event on the top or bottom sides of the stack, or to identify coordinate locations of touch events on both of the top and bottom sides of the stack.

20 Claims, 3 Drawing Sheets

TOUCH PANEL THAT HAS AN IMAGE LAYER AND DETECTS BENDING WAVES

BACKGROUND OF THE INVENTION

This invention relates generally to touch sensitive systems, and more particularly to touch panels that detect bending waves.

Touch sensitive systems are used to provide two-dimensional coordinate information. One example may be an opaque track pad while another example may be a transparent touchscreen placed in front of a display such as a liquid crystal display. Touch sensitive systems may be based on a variety of touch technologies including resistive, such as three-wire, four-wire, five-wire and nine-wire, capacitive, infrared and surface acoustic wave types, as well as bending-wave touch technologies.

In one approach, bending-wave touch systems may detect a touch based on a tap of an object, such as a key or finger, which excites bending waves in a substrate. These bending waves induce electrical signals in piezoelectric elements or sensors (piezos) bonded to the substrate. These signals are captured by electronics and processed to determine a set of (X,Y) coordinates of the touch position, such as by using matching algorithms that utilize acoustic fingerprints or by using time-of-flight methods to extract touch coordinate information from piezo signals.

Touch sensitive systems are used in many different applications, such as small hand-held devices such as phones, cameras and personal digital assistants, restaurants, banks and automated teller machines, museums and the like. Touch panel construction that is compact and durable, and which reliably detects touch events, is desirable for use in bending-wave touch systems. Furthermore, it is desirable that the system including both the touch screen and display is of a compact mechanical design.

BRIEF DESCRIPTION OF THE INVENTION

In one embodiment, a touch panel includes a substrate that has top and bottom surfaces. A reflective image layer has top and bottom surfaces and displays an image. The bottom surface of the reflective image layer is bonded to the top surface of the substrate to form a stack having top and bottom sides. At least one sensor detects signals associated with bending waves propagating through the stack. The signals are used to identify coordinate locations of at least one touch event on the top or bottom sides of the stack, or to identify coordinate locations of touch events on both of the top and bottom sides of the stack.

In one embodiment, a touch panel includes a substrate that has top and bottom surfaces. An organic light-emitting diode (OLED) image layer has top and bottom surfaces and displays an image. The bottom surface of the OLED image layer is bonded to the top surface of the substrate to form a stack having top and bottom sides. At least one sensor detects signals associated with bending waves propagating through the stack. The signals are used to identify coordinate locations of at least one touch event on the top and bottom sides of the stack, or to identify coordinate locations of touch events on both of the top and bottom sides of the stack.

In one embodiment, a touch system includes a substrate that has top and bottom surfaces. An image layer has top and bottom surfaces and displays an image. The bottom surface of the image layer is bonded to the top surface of the substrate to form a stack having top and bottom sides. At least one sensor detects signals associated with bending waves propagating through the stack. A processor identifies coordinate locations of at least one touch event on the top or bottom sides of the stack based on the signals, or identifies coordinate locations of touch events on both of the top and bottom sides of the stack based on the signals

DETAILED DESCRIPTION OF THE INVENTION

Figure 1:
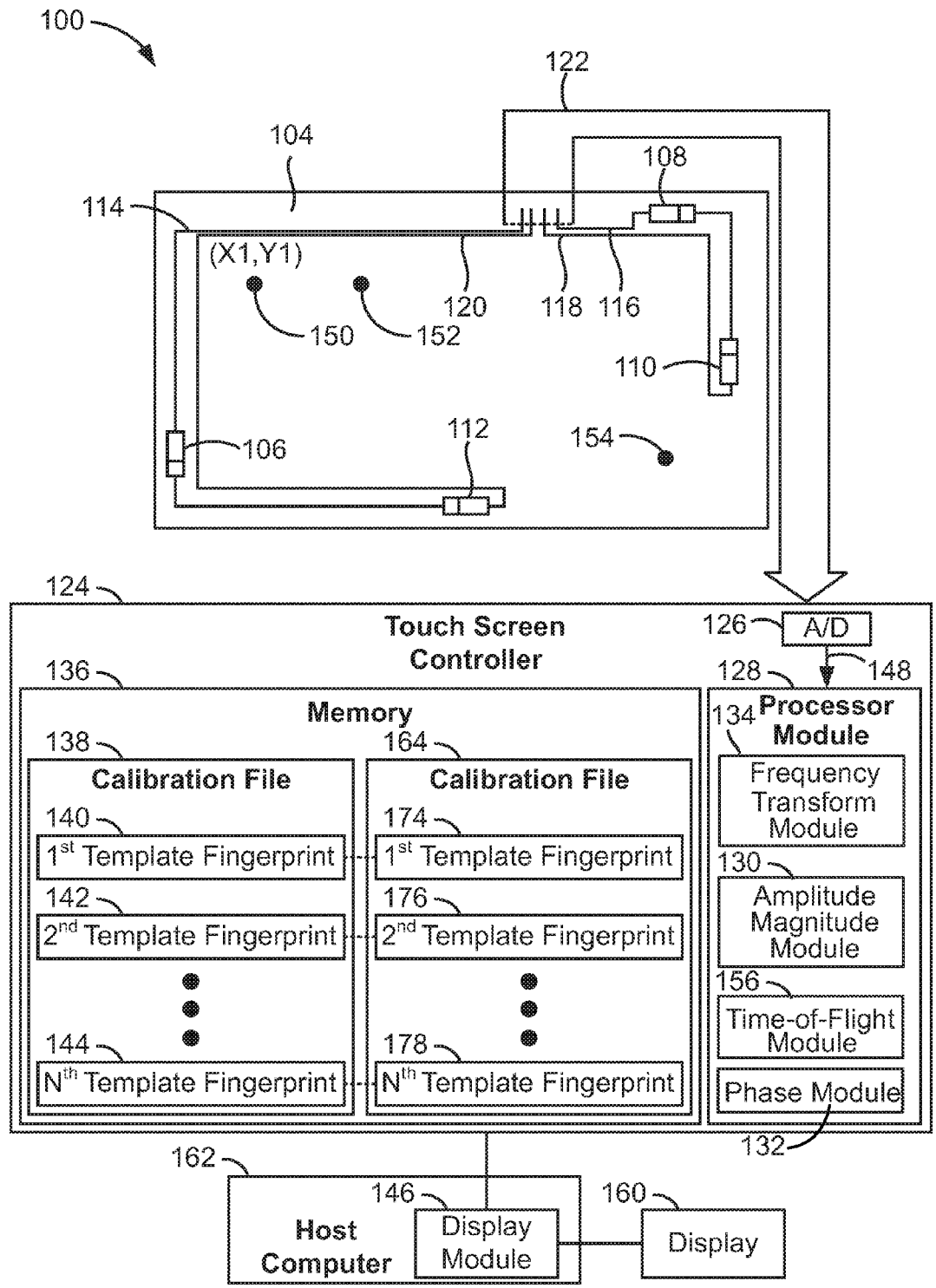
FIG. 1 illustrates a bending-wave based touch system formed in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

FIG. 1 illustrates a bending-wave based touch system 100. In one embodiment, the bending-wave based touch system 100 is a system in which the bending waves are touch generated and detected in the audio frequency range of 0-20 kHz and/or the low ultrasonic frequency range well below 1 MHz. It should be understood that other frequencies may be detected.

A substrate 104 is shown upon which sensors 106, 108, 110 and 112 and associated traces 114, 116, 118 and 120 are bonded or mounted. In another embodiment, the sensors 106-112 may be located proximate to the substrate 104, or may be formed integral with the substrate 104. In other embodiments discussed below, the sensors 106-112 and associated traces 114-120 may be bonded to or located proximate to a surface other than the substrate 104 that is in physical communication with the substrate 104. Although four sensors 106-112 are shown, the touch system 100 may utilize a single sensor, or less or more than four sensors. The sensors may be piezoelectric sensors, which may be abbreviated as "piezo sensors" or simply "piezos". The sensors may also be any other type of sensor that detects local motion or strain of the substrate 104 such as accelerometers and strain gauges of various types. The sensors 106, 108, 110 and 112 may also be referred to as microphones. The sensors 106, 108, 110 and 112 detect sound and transmit sensor signals along the traces 114, 116, 118 and 120 which interface with a touchscreen cable 122 to convey the sensor signals to a touchscreen controller 124. In another embodiment, the touchscreen controller 124 may be integral with the substrate 104 and/or display 160. In the embodiment shown in FIG. 1, the voltage difference between traces 114 and 120 is one analog signal generated by the anti-series combination of sensors 106 and 112. Similarly, the anti-series combination of sensors 108 and 110 produces an analog signal corresponding to the voltage difference between traces 116 and 118. Alternatively, sensors 112 and 110 may optionally be removed such that each of sensors 106 and 108 corresponds to one analog signal. For example, in another embodiment, a plurality of single sensors (not shown) may be used to produce signals rather than a pair of piezos or microphones interconnected in anti-series (as shown on FIG. 1). In other embodiments, more than two analog signals are produced with either altered trace interconnections and/or additional sensors (not shown). It should be understood that the sensors 106, 108, 110 and 112 are not limited to the displayed placement with respect to the substrate 104 and/or each other, and that the total number of sensors is not limited to those embodiments discussed herein.

The substrate 104 may be a sheet of material such as glass, stainless steel, aluminum or other metal, ceramic, a composite or other material or materials that propagate bending waves. Therefore, the substrate 104 may be opaque, transparent, substantially transparent, or a variant in-between.

Although shown separately in FIG. 1, the substrate 104 and display 160 are in physical communication with each other, forming a touch panel as discussed below with respect to FIGS. 2-6. That is, the substrate 104 may be positioned in front of or behind the display 160, and is bonded directly to the display 160. The display 160 may be an image layer as discussed further below. The image layer may be configured to display a fixed image, to display a set of fixed icon images whose brightnesses can be individually controlled, or may be programmable such that the image may be changed.

In general, the touch system 100 recognizes the sound created when the substrate 104 is touched at a given position that may be described as an (X,Y) coordinate location. It should be understood that other coordinate systems may be used, such as polar coordinates with a radius and angle about the origin. A touch event at each different position on the substrate 104 (or other surface in physical communication with the substrate 104) generates a unique sound. More specifically, when a user touches a point on the substrate 104, one or more sensors 106, 108, 110 and 112 on the substrate 104 detect the sound and represent the sound as a signal.

An analog to digital (A/D) converter 126, which may be located within the touchscreen controller 124, receives the two analog signals produced by sensors 106-112 over the touchscreen cable 122. The A/D converter 126 outputs digitized signals 148 that are received by a processor module 128. A frequency transform module 134 may perform a frequency transform, such as a Fourier transform, or more specifically a Fast Fourier Transform (FFT), on the digitized signals 148, outputting a frequency transform data set of frequency components associated with each of the sensor signals. An amplitude magnitude module 130 may then extract amplitude magnitude information from each of the frequency transform signals, and optionally, a phase module 132 may extract phase information from each of the frequency transform signals. The processor module 128 may construct a profile or acoustic fingerprint associated with the live touch event based on the amplitude magnitude information. In another embodiment, the processor module 128 may construct a profile or acoustic fingerprint associated with the live touch event that is based on both the amplitude magnitude information and the phase information. In other embodiments, the processor module 128 may construct the acoustic fingerprint based on the phase information or based on other information within the digitized signals 148. In yet another embodiment, the processor module 128 may utilize a time-of-flight module 156 to determine locations of touches based on time-of-flight calculations. In general, acoustic fingerprinting may be more sensitive to acoustic loss than time-of-flight because acoustic fingerprinting is most effective when longer acoustic paths involving one or more reflections contribute to signal complexity.

A memory 136 may store a calibration file 138 that contains a set of acoustic fingerprints to allow the user to successfully interact with the display 160. Prior to normal use, (X,Y) coordinate positions on the substrate 104 (and/or display 160) may be associated with the sensor signals that are generated when a series of known (X,Y) coordinate locations are touched. The signals may be processed and stored as acoustic fingerprints in the calibration file 138, such as first, second through N template fingerprints 140, 142 and 144. In some embodiments, the signals may be processed differently to create a second calibration file 164 that is also stored in the memory 136 and contains a corresponding set of acoustic fingerprints. In this example, first, second through N template fingerprints 174, 176 and 178 correspond to the first, second through N template fingerprints 140, 142 and 144, respectively, and thus represent the same (X,Y) coordinate positions on the substrate 104. In some embodiments, both of the calibration files 138 and 164 may be used for redundant validation of touch events. Calibration files 138 and 164 may be constructed based on magnitude ratios, phase differences, a combination of both magnitude ratios and phase differences, as well as other construction methods. It should be understood that additional calibration files may be used, and that in some embodiments, calibration files may be generated on-the-fly. Other embodiments, such as time-of-flight, may not utilize template fingerprints.

In the context of bending-wave touchscreen technology, acoustic fingerprints may also be referred to simply as "fingerprints." By way of example, known location 150 may correspond to the first template fingerprint 140, known location 152 may correspond to the second template fingerprint 142 and known location 154 may correspond to the Nth template fingerprint 144. The calibration file 138 therefore includes a plurality or collection of predetermined fingerprints or templates, each of which is associated with a particular (X,Y) location on the substrate. Here, the term "template" refers to a predetermined fingerprint in a calibration file. In contrast, a live acoustic fingerprint computed for a run-time touch may be referred to as a "live fingerprint".

During typical use, when a user touches the substrate 104, the processor module 128 may compare the live fingerprint to at least a subset of the template fingerprints stored in at least one of the calibration files 138 and 164. The best matching acoustic fingerprint or template may then be used to identify the location of the touch event. In another embodiment, the processor module 128 may utilize the time-of-flight module 156 to identify the location of the touch event.

The processor module 128 may then pass the (X,Y) coordinates to a display module 146 that may be stored within one or more modules of firmware or software. The display module 146 may be a graphical user interface (GUI) module such as the Microsoft Windows® operating system, for example. In one embodiment, the display module 146 is run on a host computer 162 that also runs an application code of interest to the user. The display module 146 determines whether the coordinates indicate a selection of a button or icon displayed on the display 160, or if some other response, such as a gesture (e.g. rotate or zoom), is desired. The host computer 162 or other component(s) (not shown) may take further action based on the functionality associated with the particular button or indicated action.

FIGS. 2-6 illustrate different embodiments of touch panels that may be used with the touch system 100 as discussed in FIG. 1. Like item numbers may be used to represent like elements.

Bending-wave touch systems work best if the structure through which the bending waves propagate flexes as a single mechanical unit and does so with a limited amount of acoustic damping. Structures with poor mechanical coupling between layers are problematic, as are structures containing a significant amount of acoustically absorptive material, such as a polymer material or a polymeric material. In contrast, bending waves reliably propagate in a stacked structure that includes mainly materials of good acoustic properties (such as glass or metal) and a thin layer of polymer material. With respect to organic light-emitting diode (OLED) and electrophoretic display technologies, these technologies have a thickness that is dominated by a supporting substrate with a very thin image forming layer (e.g. a small fraction of a millimeter) where the potentially bending wave absorbing polymer materials are located. For example, electrophoretic displays may include a polymeric matrix with viscous fluid bubbles inside. While traditionally displays are placed behind and are typically mechanically separate from touchscreens, FIGS. 2-6 illustrate embodiments of a highly compact touch panel based on a bending-wave propagating stacked structure that flexes as a single mechanical unit and that includes a thin image layer, which may be either an OLED image layer or a reflective image layer, such as, but not limited to, an electrophoretic image layer.

The bond between the substrate, the image layer and any other layers within a touch panel may be a mechanical, chemical or other bond that causes the layers to form a unified structure with respect to the propagation of bending waves. In some embodiments, a unified structure may include some small gaps such as air gaps between the layers depending upon the wavelength of the bending waves, the size of the touch panel, and the desired performance. For example, the image layer may be fabricated directly on the substrate surface. In another embodiment, the image layer may be fabricated separately and then bonded onto the substrate with an adhesive, glue or other bonding material. In some embodiments the adhesive may be transparent depending on whether a user will be looking through the bonding material. Various adhesives, including pressure sensitive adhesives such as acrylate and silicone adhesives, glues, epoxies, and bonding agents, as well as different bonding, connecting, laminating, and the like technologies may be used.

Figure 2A:
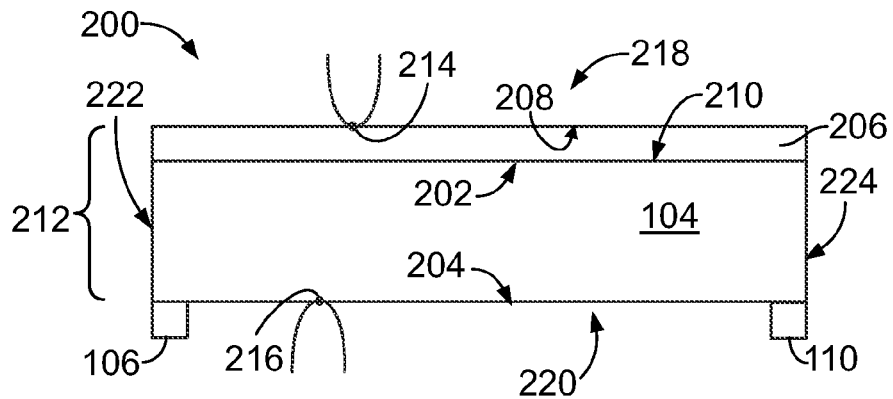
FIGS. 2-6 illustrate touch panels formed in accordance with embodiments of the present invention that may be used with the touch system of FIG. 1

FIG. 2A illustrates a touch panel 200. The substrate 104 has a top surface 202 and a bottom surface 204. There may be more sensors (not shown). An image layer 206 has a top surface 208 and a bottom surface 210. It should be noted that the top and bottom designations are used for reference only, and may also be referred to as first and second. Top and bottom designations are used to describe relationships of layers to each other. Top and bottom designations do not indicate that a surface does or does not face a user of the touch panel 200. The bottom surface 210 of the image layer 206 overlays and is bonded to the top surface 202 of the substrate 104, forming stack 212 that has a top side 218 and a bottom side 220. Although the substrate 104 and image layer 206 are shown as having sides 222 and 224 that are aligned, it should be understood that the different layers within the stack 212 may not be aligned with respect to each other. The top and bottom sides 218 and 220 indicate outer surfaces of the stack 212. In some embodiments, additional layers (not shown) may be included within the stack 212, such that a layer having a surface other than the top surface 208 and/or a layer having a surface other than the bottom surface 204 may be the outer surfaces, or top and bottom sides 218 and 220, of the stack 212. Two sensors 106 and 110 are shown as located proximate to, located on, or bonded to the bottom surface 204, which, as shown, is the outer surface of the stack 212. In other embodiments, one or both sensors 106 and 110 may be bonded to or located proximate to the bottom surface 204, and the stack 212 may include an additional layer formed over at least a portion of the bottom surface 204. Therefore, the sensors 106 and 110 may or may not be located on or proximate to an outer surface of the stack 212.

Figure 2B:
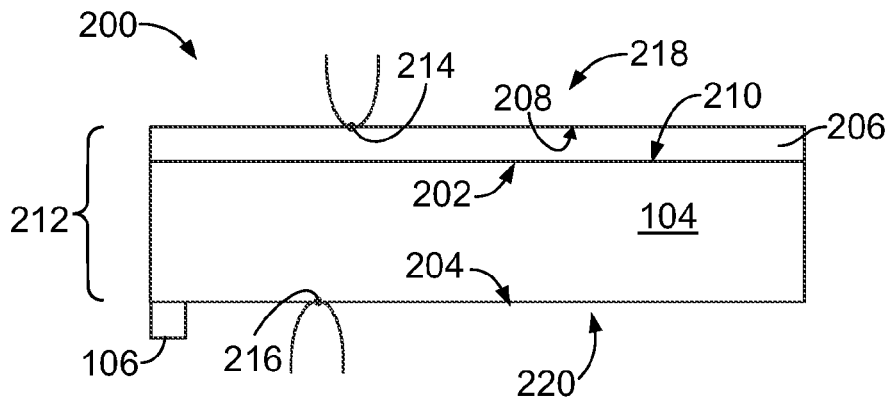

FIG. 2B illustrates the touch panel 200 of FIG. 2A wherein only one sensor 106 is used. Although the sensor 106 is shown as located proximate to the bottom side 220, the sensor 106 may be located proximate to the top side 218 or in another location as discussed further below.

Returning to FIG. 2A, the stack 212 is formed such that bending waves generated from touch events propagate through the layers of the stack 212. Although the substrate 104 is shown as being thicker than the image layer 206, it should be understood that the substrate 104 and the image layer 206 may have different thicknesses with respect to each other. In some embodiments, the substrate 104 may have a thickness that is determined based on a level of support needed to prevent the touch panel 200 from flexing beyond a predetermined degree.

The image layer 206 may be an OLED image layer or a reflective image layer. In one embodiment, the OLED image layer may comprise organic materials that are fabricated on the top surface 202 of the substrate 104. The organic materials form the active components that may be used to form an image. Although not shown, the OLED image layer may be covered by a layer of material to prevent the OLED materials from exposure to air and moisture. In another embodiment, the reflective image layer may include one of an electrophoretic image layer, an electrogyroscopic image layer, other reflective image layer technologies that may also be used for electronic paper applications, and the like. The reflective image layer may be formed or fabricated on the top surface 202 of the substrate 104, or may be formed separately from the substrate 104 and then bonded to the top surface 202 of the substrate 104. The reflective image layer may include polymer or polymeric materials that form a polymer layer but is not so limited. The polymer materials form the active components that may be used to form an image.

The image layer 206 may be fixed, such as to display a constant image. In another embodiment, the image layer 206 may be programmable, such as to display varying images, and the displayed image may change based on touch input from a user or other input, such as from the display module 146.

In some embodiments, the touch system 100 may recognize the sound created when either one or both of the top side 218 or the bottom side 220 of the stack 212 are touched (touch events are illustrated at locations 214 and 216). In the embodiment shown in FIG. 2A, the top side 218 of the stack 212 is the top surface 208 of the image layer 206, and the bottom side 220 of the stack 212 is the bottom surface 204 of the substrate 104. However, in some embodiments additional layers (not shown) may be added to that stack 212, and the top and bottoms sides 218, 220 of the stack 212 may refer to other surfaces. In embodiments wherein touches are recognized on the bottom side 220 of the stack 212, or the bottom surface 204 of the substrate 104, the substrate 104 may be substantially transparent.

Figure 3:
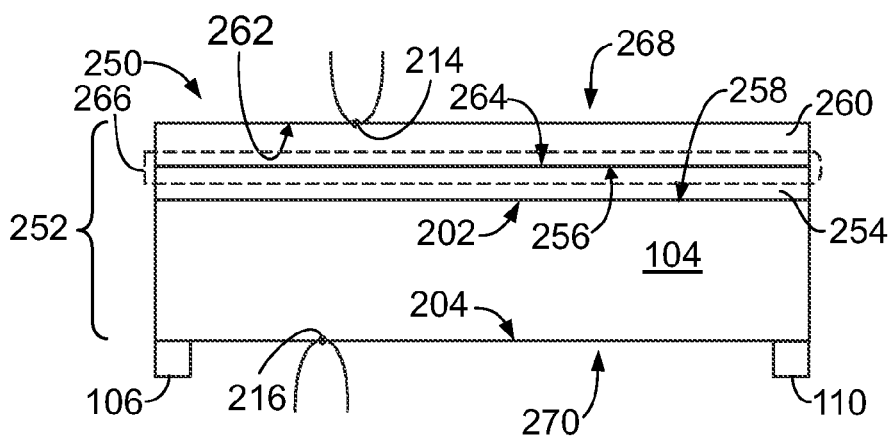

FIG. 3 illustrates a touch panel 250. The sensors 106 and 110 are bonded to or located proximate to the bottom surface 204 of the substrate 104 as previously discussed. The image layer may be an OLED image layer 254 that has a top surface 256 and a bottom surface 258. A sheet 260 also has a top surface 262 and a bottom surface 264. The sheet 260 may be a sheet of glass overlaying, or a layer of material formed over and bonded with the OLED image layer 254. A seal 266 may hermetically seal the sheet 260 and the OLED image layer 254. In some embodiments a seal 266 may not be needed, and it should be understood that other methods of hermetically sealing, or otherwise preventing the OLED image layer 254 from degradation due to air and moisture, may be used. The OLED image layer 254 may be formed on the top surface 202 of the substrate 104 or the bottom surface 264 of the sheet 260. If the OLED image layer 254 is formed on the bottom surface 264 of the sheet 260, the seal 266 may be configured to hermetically seal the OLED image layer 254 and the substrate 104 and/or the sheet 260 and the substrate 104. Again, the thicknesses of the OLED image layer 254, the sheet 260 and the substrate 104 may vary with respect to each other and are not limited to the illustrated relationship. The thicknesses of the sheet 260 and the substrate 104 may be based at least on the level of support desired for the touch panel 250.

Stack 252 includes the substrate 104, the OLED image layer 254 and the sheet 260, and has a top side 268 and a bottom side 270. The stack 252 may include other layers (not shown). The layers of the stack 252 are attached or bonded together such that bending waves propagate through the stack 252.

In one embodiment, if the OLED image layer 254 is to be viewed from the top side 268 of the stack 252, the sheet 260 (or layer of material) may be formed of a substantially transparent material and the substrate 104 may be opaque. In another embodiment, if the OLED image layer 254 is to be viewed from the bottom side 270 of the stack 252, the substrate 104 may be transparent and the material forming the sheet 260 may be opaque, transparent, or a variation in-between. If the OLED image layer 254 may be viewed from both of the top 268 and bottom sides 270, both the sheet 260 and the substrate 104 may be formed of substantially transparent material(s).

As discussed above, a touch event may be detected on one or both of the top and bottom sides 268, 270 of the stack 252 (or top 262 or bottom surfaces 204), such as at the locations 214 and 216, respectively. In another embodiment, the stack 252 may include a reflective layer (not shown) that increases the light output by the OLED image layer 254. The position of the reflective layer within the stack 252 may be based at least in part on whether touch events are detected on the top side 268 or the bottom side 270.

Figure 4:
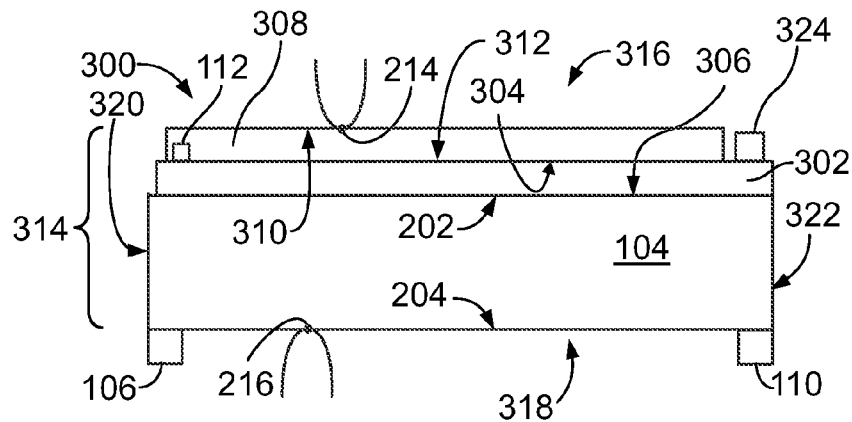

FIG. 4 illustrates a touch panel 300. The sensors 106 and 110 are located proximate to and/or bonded onto the bottom surface 204 of the substrate 104 as previously discussed. Although both sensors 106 and 110 are shown, the touch panel 300 may utilize a single sensor 106 or 110 or more than two sensors. The image layer may be a reflective image layer 302 that has a top surface 304 and a bottom surface 306. For example, the reflective image layer 302 may be an electrophoretic image layer or an electrogyroscopic image layer. A sheet 308 of material also has a top surface 310 and bottom surface 312. As discussed above, the optical transmission properties of the sheet 308 and the substrate 104 may vary depending upon the application of the touch panel 300. The reflective image layer 302 may be formed on the top surface 202 of the substrate 104 or the bottom surface 312 of the sheet 308. In another embodiment, the reflective image layer 302 may be formed separately and then bonded onto one or both of the top surface 202 of the substrate 104 or the bottom surface 312 of the sheet 308.

Stack 314 has a top side 316 and a bottom side 318 and includes the substrate 104, the reflective image layer 302 and the sheet 308. The stack 314 may include other layers (not shown). The layers of the stack 314 may be attached or bonded together such that bending waves propagate through the stack 314. In some embodiments, one or more touch events may be detected on one or both of the top and bottom sides 316, 318 (or top surface 310 and bottom surface 204), such as at the locations 214 and 216, respectively. Multiple touch events may occur overlapping in time with respect to each other, such as occurring simultaneously, or may occur separately in time. In some embodiments, not all of the layers in the stack 314 may be bonded together.

One or more layers of the stack 314 may not be aligned with other layers along sides 320 and 322. For example, the sheet 308 may overlay at least a portion of the reflective image layer 302, but not all. In some embodiments it may not be necessary for the sheet 308 to fully cover the reflective image layer 302, such as in areas under a bezel (not shown). The reflective image layer 302 may be aligned with one, both or neither (as shown) of the sheet 308 and the substrate 104.

In some embodiments, sensor 324 may be located proximate to the reflective image layer 302. The sensor 324 may be the only sensor used in the touch panel 300, or may be used together with one or more sensors located on the same surface or a different side or surface, such as with one or both of sensors 106 and 110. In yet another embodiment, one or more sensor may be located within the stack 314, or imbedded within the stack 314, such as sensor 326. Sensor 326 may be located proximate to the bottom surface 312 and/or the top surface 304 but is not so limited. In another embodiment, a single sensor 106, 110, 324 or 326 may be used in the touch panel 300.

Figure 5:
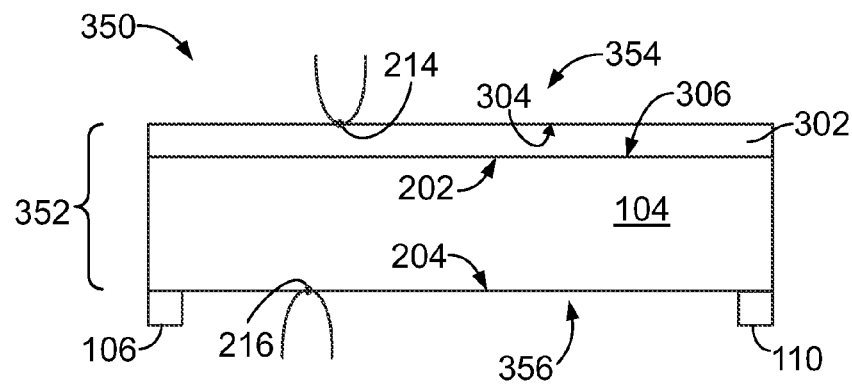

FIG. 5 illustrates a touch panel 350 wherein stack 352 includes the substrate 104 and the reflective image layer 302 which have been bonded together. The reflective image layer 302 may be an electrophoretic image layer or an electrogyroscopic image layer as discussed above with respect to FIG. 4. As shown, the sensors 106 and 110 may be bonded to the bottom surface 204 of the substrate 104, which in this embodiment is an outer surface of the stack 352. In another embodiment, the sensors 106 and 110 may be bonded to the top surface 304 of the reflective image layer 302. Because the layers of the stack 352 are bonded together such that bending waves propagate through the stack 352, it is possible to detect signals resulting from touch events on either or both of the top surface 304 of the reflective image layer 302 and the bottom surface 204 of the substrate 104, or from one or both of top and bottom sides 354, 356 of the stack 212.

Figure 6:
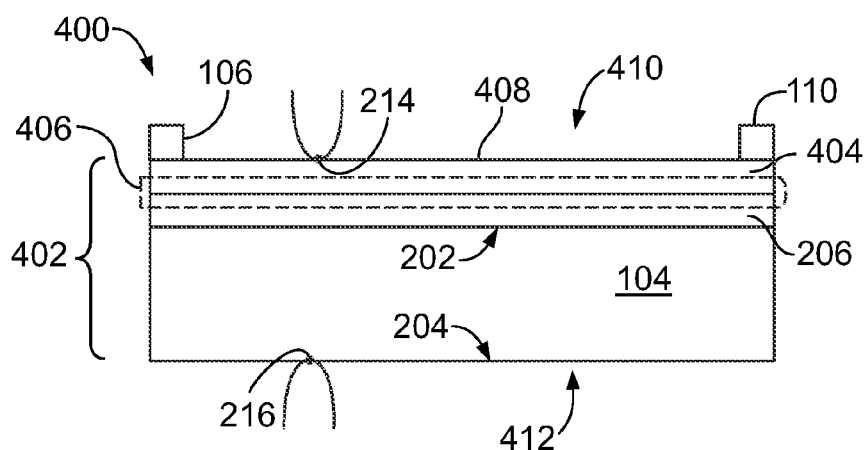

FIG. 6 illustrates a touch panel 400. Stack 402 includes the substrate 104, the image layer 206, which may be a reflective image layer or an OLED image layer, and a sheet 404. The sensors 106 and 110 may be bonded to top surface 408 of the sheet 404. The substrate 104, image layer 206 and sheet 404 may be bonded together so that bending waves propagate through the stack 402. In some embodiments, a seal 406 may hermetically seal the image layer 206 and the sheet 404 and/or seal the image layer 206 and the substrate 104 as discussed previously. Bending waves resulting from touch events may be detected on one or both of the outer top surface 408 of the sheet 404 and the bottom surface 204 of the substrate 104, such as from either side 410 or 412 of the stack 402.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A touch system comprising:
    a substrate configured to have top and bottom surfaces;
    a reflective image layer having top and bottom surfaces and configured to display an image, the bottom surface of the image layer being bonded to the top surface of the substrate to form a stack having top and bottom sides; and
    at least one sensor configured to detect signals associated with bending waves propagating through the stack,
    wherein the signals associated with bending waves propagating through the stack are used to identify coordinate locations of at least one touch event on the top or bottom sides of the stack or to identify coordinate locations of touch events on both of the top and bottom sides of the stack.

2. The touch system of claim 1, wherein the image layer is programmable.

3. The touch system of claim 1, wherein the reflective image layer comprises an electrophoretic image layer or an electrogyroscopic image layer.

4. The touch system of claim 1, wherein the reflective image layer comprises an electrophoretic image layer, and wherein the at least one sensor is located proximate to the bottom side of the stack or proximate to the bottom surface of the substrate.

5. The touch system of claim 1, wherein the reflective image layer comprises a polymer layer.

6. The touch system of claim 1, wherein the stack further comprises a sheet of substantially transparent material overlaying at least a portion of the reflective image layer.

7. The touch system of claim 1, wherein the stack further comprises a sheet of material overlaying at least a portion of the reflective image layer.

8. The touch system of claim 1, wherein the at least one sensor is located within the stack.

9. The touch system of claim 1, wherein the at least one sensor further comprises at least two sensors that are located proximate to the top side of the stack, the bottom side of the stack, or both.

10. The touch system of claim 1, wherein the substrate comprises glass, metal, ceramic or a composite material.

11. The touch system of claim 1, wherein the coordinate locations of the at least one touch event or the touch events are configured to be determined based on acoustic fingerprints or time-of-flight.

12. A touch system comprising:
    a substrate configured to have top and bottom surfaces;
    an organic light-emitting diode (OLED) image layer having top and bottom surfaces and configured to display an image, the bottom surface of the OLED image layer being bonded to the top surface of the substrate to form a stack having top and bottom sides; and
    at least one sensor configured to detect signals associated with bending waves propagating through the stack,
    wherein the signals associated with bending waves propagating through the stack are used to identify coordinate locations of at least one touch event on the top and bottom sides of the stack or to identify coordinate locations of touch events on both of the top and bottom sides of the stack.

13. The touch system of claim 12, further comprising a sheet of material overlaying the top surface of the OLED image layer, the OLED image layer and the sheet being sealed together.

14. The touch system of claim 12, wherein the OLED image layer is fabricated on the top surface of the substrate.

15. The touch system of claim 12, wherein the stack further comprises a sheet of material, and wherein the OLED image layer is fabricated on the sheet.

16. The touch system of claim 12, wherein the OLED image layer is programmable.

17. The touch system of claim 12, wherein the coordinate locations of the at least one touch event or the touch events are configured to be determined based on acoustic fingerprints or time-of-flight.

18. The touch system of claim 12, wherein the at least one sensor further comprises at least two sensors that are located proximate to the top side of the stack, the bottom side of the stack, or both.

19. The touch system of claim 12, wherein the substrate comprises glass, metal, ceramic, or a composite material.

20. A touch system comprising:
    a substrate configured to have top and bottom surfaces;
    an image layer having top and bottom surfaces and configured to display an image, the bottom surface of the image layer being bonded to the top surface of the substrate to form a stack having top and bottom sides;
    at least one sensor configured to detect signals associated with bending waves propagating through the stack; and
    a processor configured to identify coordinate locations of at least one touch event on the top or bottom sides of the stack based on the signals or to identify coordinate locations of touch events on both of the top and bottom sides of the stack based on the signals.

* * * * *